US011085568B2

(12) United States Patent
Nelson et al.

(10) Patent No.: US 11,085,568 B2
(45) Date of Patent: Aug. 10, 2021

(54) CENTER PIVOT IRRIGATION GOOSENECK WITH VARYING CROSS-SECTIONAL DIAMETERS

(71) Applicant: NELSON IRRIGATION CORPORATION, Walla Walla, WA (US)

(72) Inventors: Craig B. Nelson, Walla Walla, WA (US); Reid A. Nelson, Walla Walla, WA (US); Riley D. Greenwood, Walla Walla, WA (US); Chad D. Leinweber, Walla Walla, WA (US); Michael R. Townsend, Waitsburg, WA (US)

(73) Assignee: NELSON IRRIGATION CORPORATION, Walla Walla, WA (US)

(*) Notice: Subject to any disclaimer, the term of this patent is extended or adjusted under 35 U.S.C. 154(b) by 379 days.

(21) Appl. No.: 16/314,743

(22) PCT Filed: Jul. 7, 2017

(86) PCT No.: PCT/US2017/041182
§ 371 (c)(1),
(2) Date: Jan. 2, 2019

(87) PCT Pub. No.: WO2018/009857
PCT Pub. Date: Jan. 11, 2018

(65) Prior Publication Data
US 2019/0154181 A1 May 23, 2019

Related U.S. Application Data

(60) Provisional application No. 62/359,489, filed on Jul. 7, 2016.

(51) Int. Cl.
F16L 43/00 (2006.01)
A01G 25/09 (2006.01)
(Continued)

(52) U.S. Cl.
CPC .......... *F16L 43/008* (2013.01); *A01G 25/092* (2013.01); *F16L 9/128* (2013.01); *F16L 13/02* (2013.01); *F16L 41/023* (2013.01)

(58) Field of Classification Search
CPC .......... F16L 43/00; F16L 41/023; F16L 13/02
(Continued)

(56) References Cited

U.S. PATENT DOCUMENTS 298,059 A 5/1884 Bennett
1,901,897 A 3/1933 Clayton
(Continued)

FOREIGN PATENT DOCUMENTS

CN 102059514 A 5/2011
CN 102301174 A 12/2011
(Continued)

OTHER PUBLICATIONS

Austrian Office Action dated Nov. 26, 2020 issued in Austrian Patent Application No. A9220/2017 and English translation, 4 pp.
(Continued)

*Primary Examiner* — Patrick F Brinson
(74) *Attorney, Agent, or Firm* — Nixon & Vanderhye P.C.

(57) ABSTRACT

A gooseneck pipe includes a first pipe half having a first radiused centerline curve, and a second pipe half fixed to the first pipe half and having a second radiused centerline curve. The first and second pipe halves define a flow path. Cross-sectional diameters of the first and second pipe halves vary along the flow path. The varying diameters of the first and second pipe halves serve to mitigate pressure losses due in part to Dean vortices or secondary flow patterns in the flow path when a fluid is turned in the gooseneck pipe.

24 Claims, 13 Drawing Sheets

(51) Int. Cl.
*F16L 9/128* (2006.01)
*F16L 13/02* (2006.01)
*F16L 41/02* (2006.01)

(58) Field of Classification Search
USPC .............. 138/120, 155, 109; 285/179, 134.1, 285/135.1
See application file for complete search history.

(56) References Cited

U.S. PATENT DOCUMENTS

| | | | |
|---|---|---|---|
| 1,989,608 A | | 1/1935 | Reed |
| 2,879,848 A | * | 3/1959 | Drummond ............. E21B 17/00 166/68 |
| 3,834,768 A | * | 9/1974 | Stoltzfus ............... A01F 25/186 406/160 |
| 4,298,206 A | | 11/1981 | Kojima |
| 4,564,881 A | | 1/1986 | Kant et al. |
| 4,796,926 A | * | 1/1989 | Rapsilver ................ E03F 1/008 141/311 R |
| 6,422,608 B1 | | 7/2002 | Lee et al. |
| 2002/0148216 A1 | * | 10/2002 | Brault ................... F04D 27/023 60/226.1 |
| 2011/0220233 A1 | | 9/2011 | Nelson et al. |
| 2014/0054157 A1 | * | 2/2014 | Krebber ................. C10B 41/08 201/35 |
| 2014/0097305 A1 | | 4/2014 | Shelton |
| 2014/0369814 A1 | | 12/2014 | Theratil et al. |

FOREIGN PATENT DOCUMENTS

| | | |
|---|---|---|
| CN | 202266361 U | 6/2012 |
| CN | 206706138 U * | 12/2017 |
| CN | 210970916 U * | 7/2020 |
| DE | 1123256 | 2/1962 |
| DE | 25 18 001 | 10/1975 |
| EP | 0 532 697 | 3/1998 |
| GB | 184082 | 8/1922 |

OTHER PUBLICATIONS

Chinese Office Action dated Oct. 19, 2020 issued in Chinese Patent Application No. 201780042165.7 and English translation, 24 pp.
Li, Gang, "Casting Model Practice," §6.12 Gooseneck Tube Manufacturing Process, Published by Northeastern University, Dec. 31, 1995, pp. 292-299.
International Search Report dated Sep. 11, 2017 issued in PCT International Patent Application No. PCT/US2017/041182, 4 pp.
Austrian Office Action and Search Report dated Feb. 13, 2020 issued in Austrian Patent Application No. A9220/2017 and English translation, 7 pp.

* cited by examiner

CENTER PIVOT IRRIGATION GOOSENECK WITH VARYING CROSS-SECTIONAL DIAMETERS

CROSS-REFERENCES TO RELATED APPLICATIONS

This application is the U.S. national phase of International Application No. PCT/US2017/041182 filed Jul. 7, 2017 which designated the U.S. and claims priority to U.S. Provisional Patent Application No. 62/359,489 filed Jul. 7, 2016, the entire contents of each of which are hereby incorporated by reference.

This application claims the benefit of U.S. Provisional Patent Application Ser. No. 62/359,489, filed Jul. 7, 2016, the entire content of which is herein incorporated by reference.

STATEMENT REGARDING FEDERALLY SPONSORED RESEARCH OR DEVELOPMENT (NOT APPLICABLE)

BACKGROUND

The invention relates to a gooseneck pipe for use with center pivot irrigation and, more particularly, to a gooseneck pipe having an optimized flow path to mitigate pressure loss due in part to secondary flow patterns such as Dean vortices.

Pivot systems consist of elevated lateral pipes that convey water from the inlet of the system, generally in the center of the irrigated area, to the outer boundary of the field. The lateral pipes are mechanically moved during irrigation to provide large irrigated areas relative to the number and size of the system components. Because of their relatively large irrigated area, pivot systems also require relatively large water volumes for proper operation. There is an established infrastructure of software programs, assembly departments, and installation processes to configure the set of components that apply water. The infrastructure is designed to optimize the configuration to require the minimum system operating pressure that results in supplying at each of the sprinklers a pressure that meets or exceeds what has been determined by the manufacturer as the minimum allowable for efficiently applying water. Therefore, it is desirable for the pressure of the entire flow of the pivot system to be raised enough to compensate for losses in the components that convey water to the sprinklers. The friction losses of these components have a large impact on the pumping requirements and operating costs of the irrigation system. Minimizing friction losses is highly desirable for all components utilized on pivot systems.

Goosenecks are common components on pivot systems. Their function is to convey a portion of the water from the elevated main lateral pipe of the pivot to other components that ultimately deliver the water to a sprinkler. The pivot industry has standardized on providing outlets on the upper side of the main lateral pipe in order to reduce the amount of solids that are conveyed to the sprinklers along the system. The majority of pivot sprinklers are operated below the main lateral pipe to reduce the potential for evaporation and wind drift. As such, the water from the outlet on top of the main lateral pipe is turned approximately 180 degrees and downwards toward the sprinkler (see FIG. 1). This redirection of the water has a high potential for increased friction losses. The component that performs this function provides a good opportunity for improving the efficiency of the pivot system and reducing system operating costs.

The optimum configurations of the sprinklers for irrigating different crops have been influenced by operating experience, academic research, and economic considerations. A specific pivot system could in successive years be used to irrigate a crop where the optimum configuration is elevated sprinklers oriented upwards above the main lateral pipe, and a crop best irrigated by sprinklers mounted below the lateral pipe, near the ground. A device to assist the transition between upwards and downwards sprinkler orientations would offer the advantage of always utilizing optimum configurations without increasing labor costs, and it would reduce the chance of errors that could occur if one configuration must be removed and another installed for every crop transition.

FIG. 2 shows an exemplary pivot irrigation assembly including an elevated main lateral pipe. Hoses are secured to hose drop outlets, and sprinklers for distributing water flow are secured at ends of the hoses. The assembly shown in FIG. 2 includes a sprinkler/regulator package that can be designated for a different system flow rate.

It is desirable to maximize an amount of flow while minimizing pressure losses from the inlet to the outlet. Existing gooseneck pipes may be cost effectively molded from plastic materials. In order to mold the gooseneck pipes in one piece, however, the core must be pulled out tangentially along the flow path centerline, which requires the cross section to taper. As a consequence, geometries of existing gooseneck pipes are limited.

BRIEF SUMMARY

A gooseneck pipe according to the described embodiments utilizes a two-piece mold design. In this manner, the gooseneck pipe can include a varying cross-sectional diameter to optimize the flow path. By increasing the cross-sectional area where the fluid is turned in the gooseneck pipe, pressure losses can be reduced for greater flow rates, which can become significant over an entire pivot. The optimized flow path helps to mitigate the extent of Dean vortices or secondary flow patterns when fluid at high flow rates is turned 180 degrees in the gooseneck. In some embodiments, the gooseneck has a lofted flow path with two differently-radiused (but tangent) centerline/guide curves. Defined along the centerline/guide curves are varying cross-sectional diameters further defining the lofted flow path. Gradually increasing the cross-sectional flow path helps to slow the average fluid velocity, reducing the overall pressure loss through the 180-degree-bend gooseneck. Some of this reduced pressure loss is due to the lower fluid velocity resulting in less detrimental secondary flows (not in direction of primary flow, or anti-streamwise) developing. Test data backs up the pressure loss observation.

In an exemplary embodiment, a gooseneck pipe includes a first pipe half having a first radiused centerline curve, and a second pipe half fixed to the first pipe half and having a second radiused centerline curve. The first and second pipe halves define a flow path. Cross-sectional diameters of the first and second pipe halves vary along the flow path. In some embodiments, the first and second radiused centerline curves are different.

The cross-sectional diameters of the first and second pipe halves are preferably configured to mitigate pressure losses due in part to Dean vortices or secondary flow patterns when a fluid in the flow path is turned by the gooseneck pipe. In a streamwise or flow direction, the cross-sectional diameter of the first pipe half may increase along the flow path, and the cross-sectional diameter of the second pipe half may decrease along the flow path. In this context, the cross-sectional diameter at a distal end of the first pipe half may be about 1.5 times that of the cross-sectional diameter at a proximal end of the first pipe half, and the cross-sectional diameter at a proximal end of the second pipe half may be about 1.5 times that of the cross-sectional diameter at a distal end of the second pipe half.

The first radiused centerline curve may be larger than the second radiused centerline curve. Additionally, the first radiused centerline curve may be tangent to the second radiused centerline curve. The flow path may be curved in one of a circular and elliptical configuration. An entrance angle of the first pipe half may be substantially tangent to the first radiused centerline curve, and an exit angle of the second pipe half may be substantially tangent to the second radiused centerline curve.

The first pipe half may be connected to the second pipe half with a friction weld.

At least one of the first pipe half and the second pipe half may include a reinforcement rib. In some embodiments, the first pipe half may include an external reinforcement rib, or the first pipe half may have a pair of internal reinforcement ribs that extend in a direction of the flow path.

The gooseneck pipe may include an auxiliary outlet port extending from the first pipe half. In this context, the gooseneck pipe may additionally include an external reinforcement rib connected between the auxiliary outlet port and the first pipe half. The gooseneck pipe may include a shut-off valve coupled with one of the first and second pipe halves. The shut-off valve may include a valve assembly with a valve stem and a valve seat disposed at a distal end of the valve stem. The one of the first and second pipe halves may comprise a valve shut-off face with which the valve seat may be engageable in a valve-closed position. In some embodiments, the valve seat may be curved along its length and across its width.

In another exemplary embodiment, a gooseneck pipe includes a first pipe half having a first radiused centerline curve, and a second pipe half fixed to the first pipe half and having a second radiused centerline curve, different from the first radiused centerline curve. The first and second pipe halves define a flow path. A cross-sectional diameter of the first pipe half increases along the flow path, and a cross-sectional diameter of the second pipe half decreases along the flow path. The first radiused centerline curve is larger than the second radiused centerline curve.

In yet another exemplary embodiment, a method of manufacturing a gooseneck pipe includes the steps of molding a first pipe half having a first radiused centerline curve; molding a second pipe half having a second radiused centerline curve, different from the first radiused centerline curve, the first and second pipe halves defining a flow path, wherein the molding processes are practiced such that cross-sectional diameters of the first and second pipe halves vary along the flow path; and connecting the first pipe half and the second pipe half. The molding processes may be practiced such that the cross-sectional diameters of the first and second pipe halves are configured to mitigate Dean vortices or secondary flow patterns when a fluid in the flow path is turned by the gooseneck pipe. The molding processes may be practiced such that, in a flow direction, the cross-sectional diameter of the first pipe half increases along the flow path, and the cross-sectional diameter of the second pipe half decreases along the flow path. The molding processes may be practiced such that the first radiused centerline curve is larger than the second radiused centerline curve.

BRIEF DESCRIPTION OF THE DRAWINGS

These and other aspects and advantages will be described in detail with reference to the accompanying drawings, in which.

DETAILED DESCRIPTION

Figure 1:
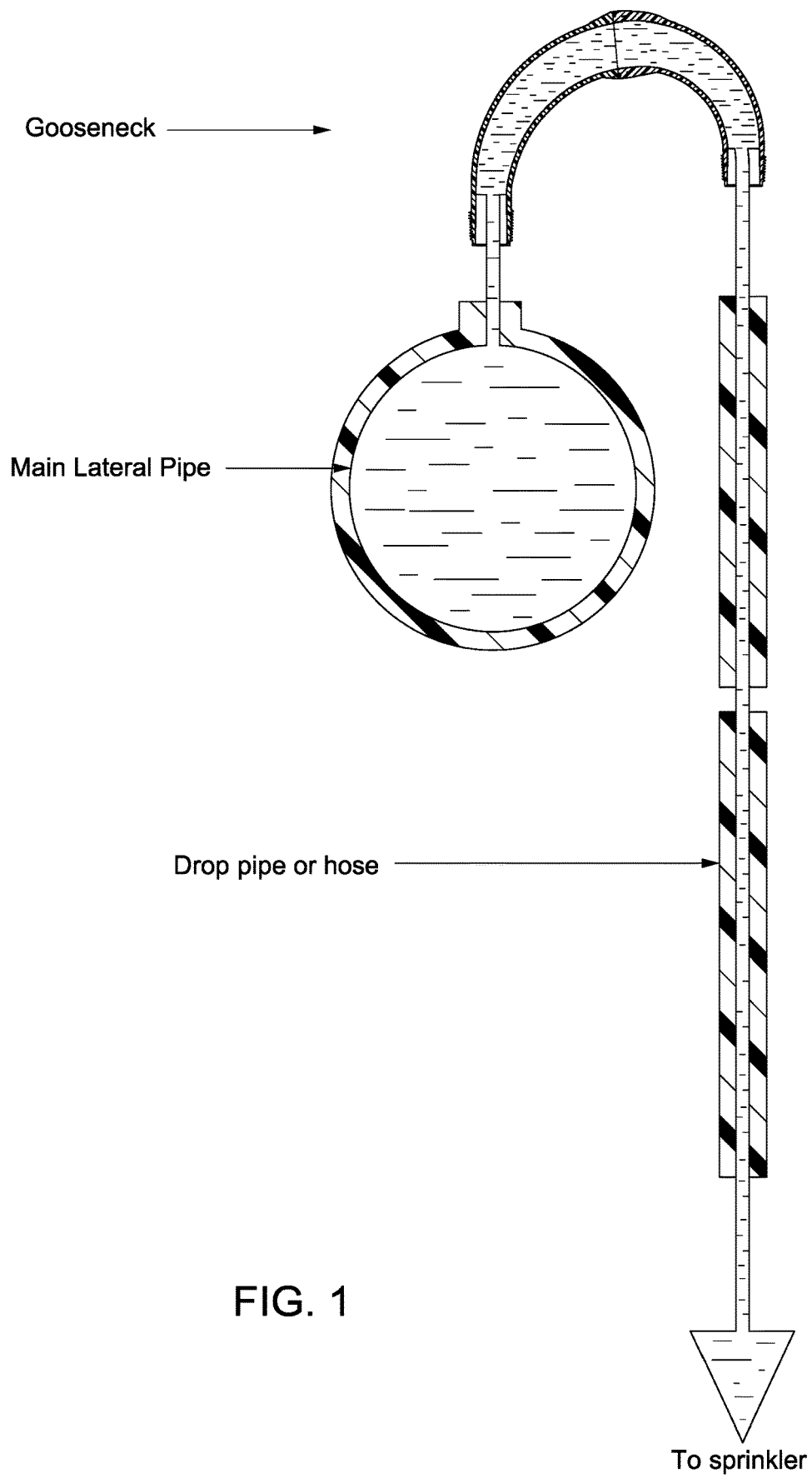
FIG. 1 shows an exemplary application of a gooseneck pipe for use with center pivot irrigation.
Figure 2:
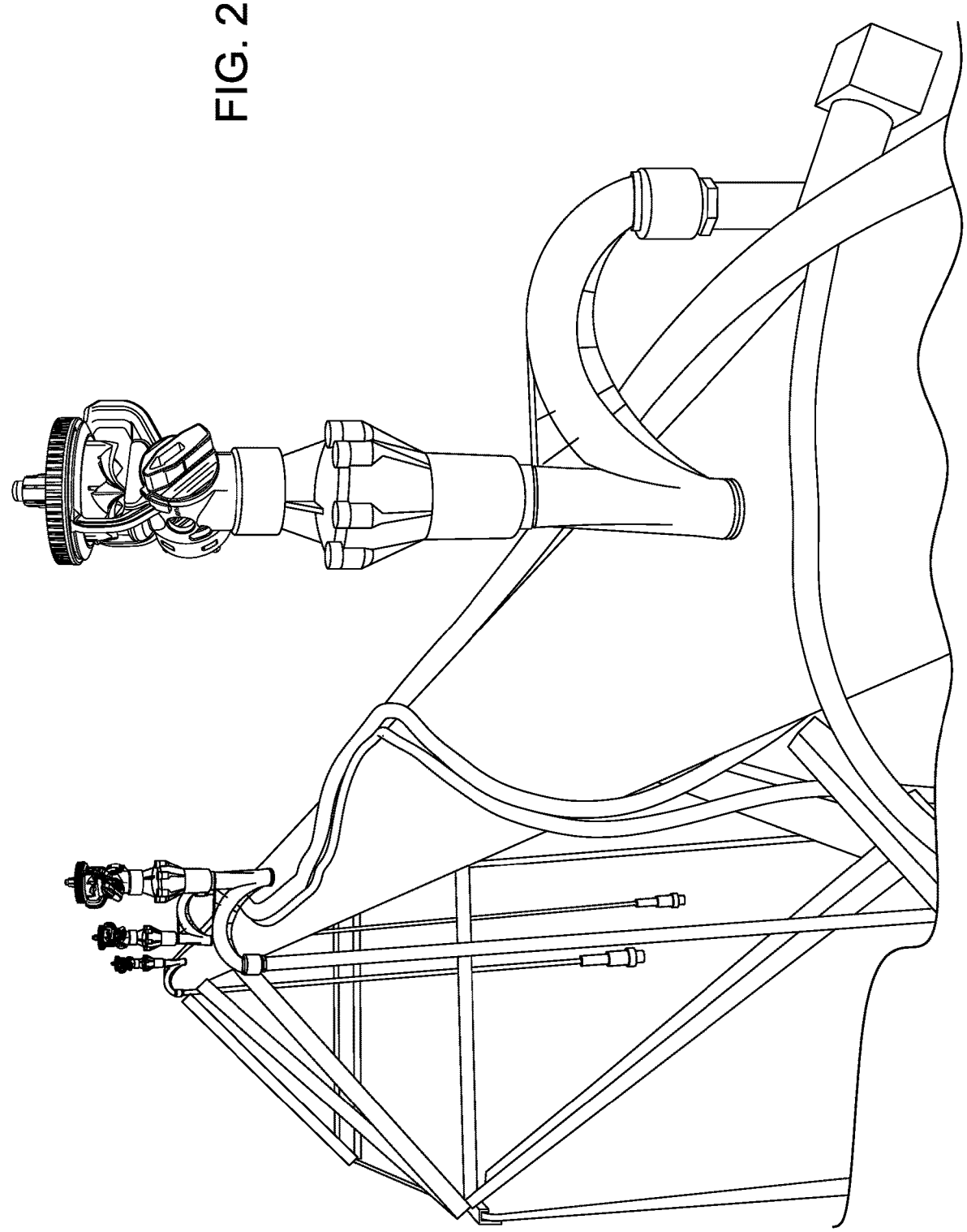
FIG. 2 shows an exemplary pivot irrigation assembly including an elevated main lateral pipe.
Figure 3:
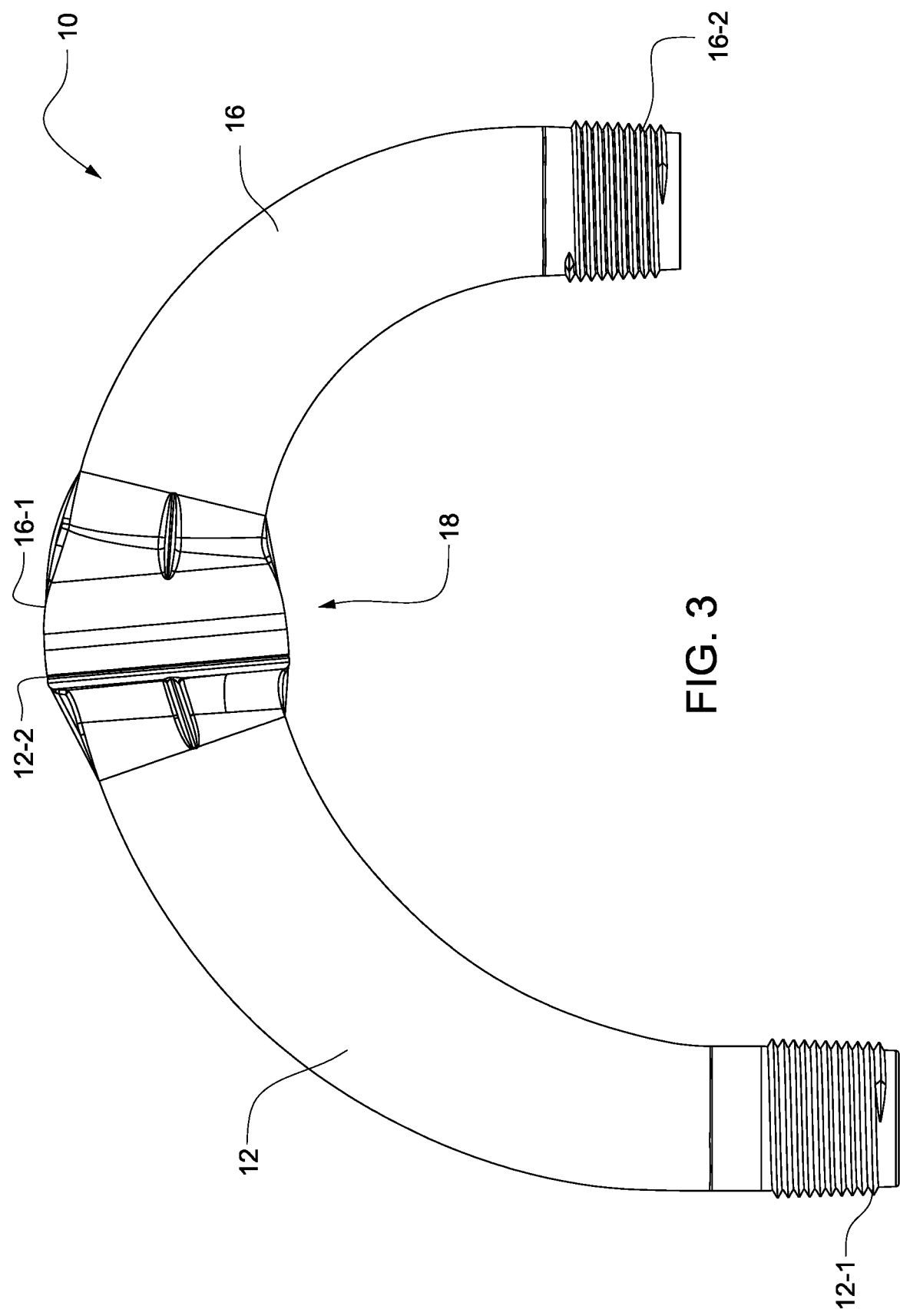
FIG. 3 is a side view of an exemplary gooseneck pipe according to the described embodiments.
Figure 4:
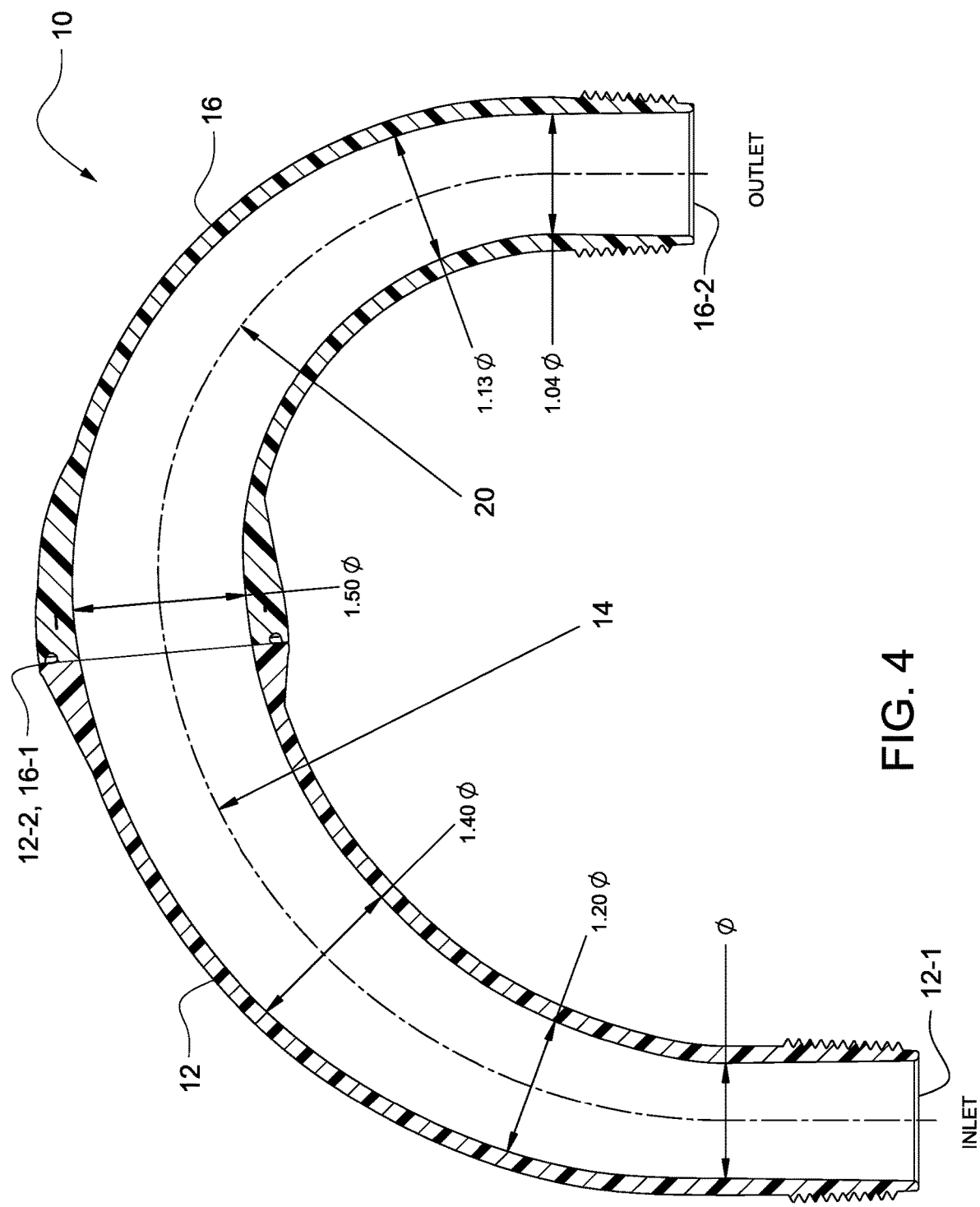
FIG. 4 is a cross-sectional view of the gooseneck pipe shown in FIG. 3.
Figure 5:
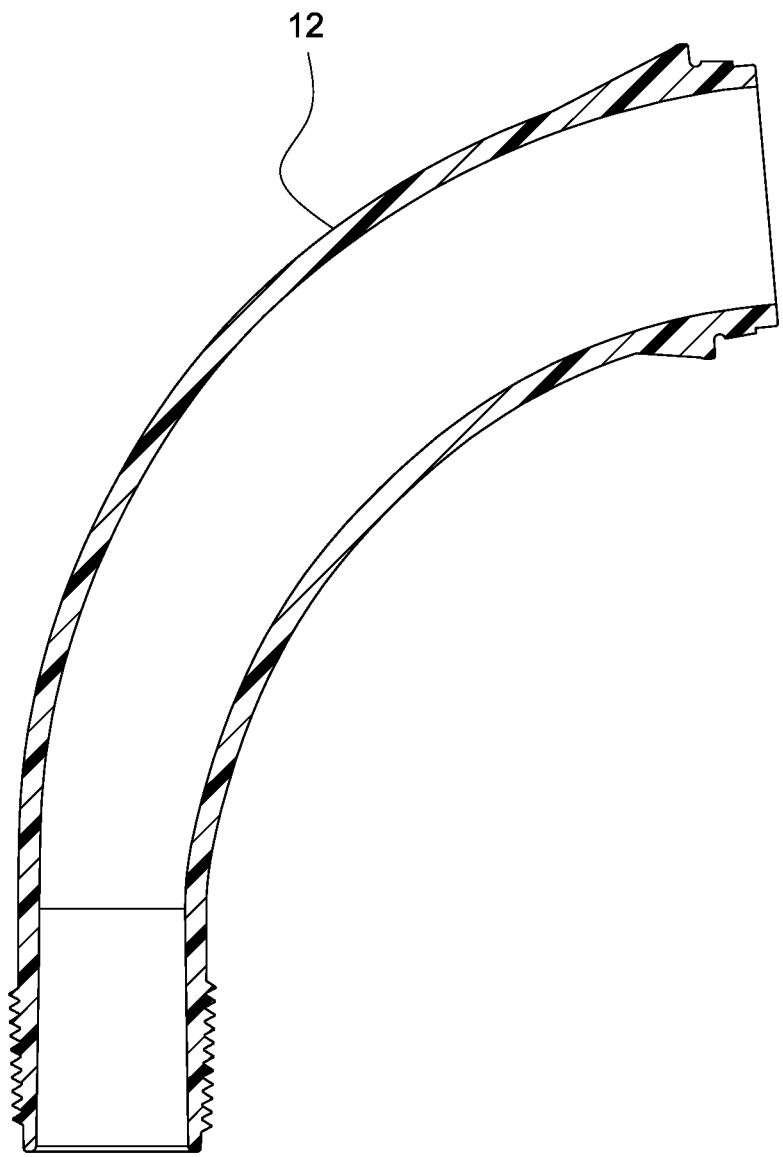
FIGS. 5 and 6 are respective views of the first and second pipe halves that are connected to form the gooseneck pipe.
Figure 6:
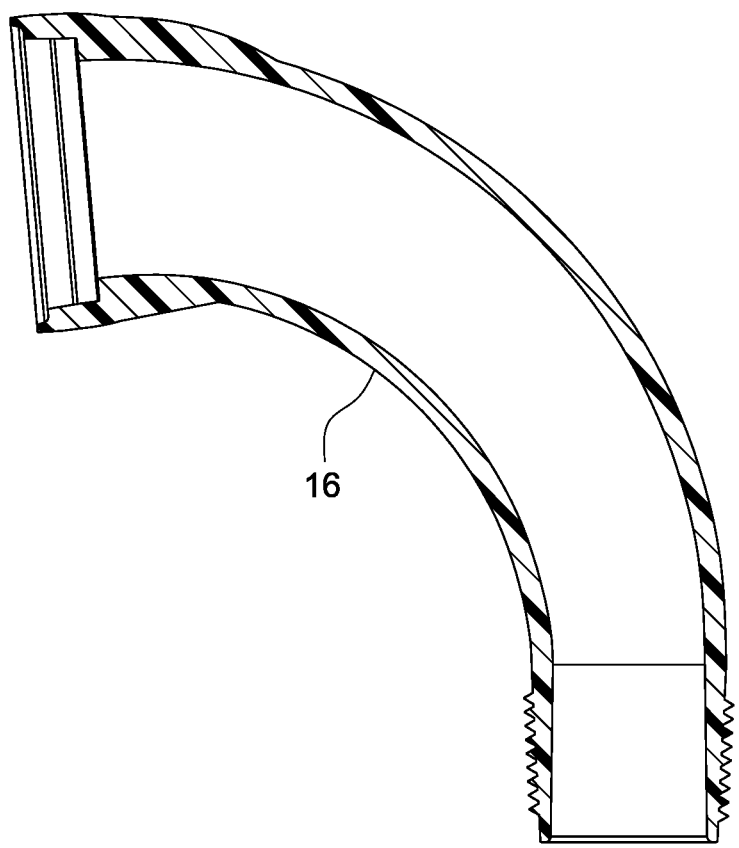

FIGS. 3-7 show a gooseneck pipe of a first exemplary embodiment. The gooseneck pipe 10 includes a first pipe half 12 having a first radiused centerline curve 14 (FIG. 4). A second pipe half 16 is fixed to the first pipe half via a spin weld or friction weld joint 18 or the like. References to the first pipe "half" and the second pipe "half" are not meant to be limited to equal halves of the gooseneck pipe, but rather are intended merely to reference separate portions of the gooseneck pipe. The second pipe half 16 includes a second radiused centerline curve 20 that is different from the first radiused centerline curve 14. As shown, the first radiused centerline curve 14 is tangent to the second radiused centerline curve 20. The first pipe half 12 may be an inlet pipe half, and the second pipe half 16 may be an outlet pipe half. The first radiused centerline curve 14 may be larger than the second radiused centerline curve 20. The first 12 and second 16 pipe halves define a flow path. As shown, the flow path is curved in a circular configuration. Prototypes used in testing were not limited to circular flow paths. Other tested shapes include elliptical and elliptically tri-lobed inspired cross sections. Overall, a circular cross section provided the most efficient results.

In some embodiments, the cross-sectional diameters of the first 12 and second 16 pipe halves are configured to mitigate Dean vortices or secondary flow patterns when a fluid in the flow path is turned by the gooseneck pipe 10. For example, cross-sectional diameters of the first 12 and second 16 pipe halves may vary along the flow path. In some embodiments, in a flow direction, the cross-sectional diameter of the first/inlet pipe half 12 may increase along the flow path, and the cross-sectional diameter of the second/outlet pipe half 16 may decrease along the flow path. In one construction, the cross-sectional diameter at a distal end 12-2 (in the flow direction) of the first pipe half 12 is about 1.5 times that of the cross-sectional diameter at a proximal end 12-1 of the first pipe half 12. Similarly, the cross-sectional diameter at a proximal end 16-1 of the second pipe half 16 may be about 1.5 times that of the cross-sectional diameter at a distal end 16-2 of the second pipe half 16.

In order to most efficiently mitigate pressure losses and secondary flow patterns, an entrance angle of the first pipe half 12 may be substantially tangent to the first radiused centerline curve 14. Similarly, an exit angle of the second pipe half 16 may be substantially tangent to the second radiused centerline curve 20.

In the exemplary cross section shown in FIG. 4, the gooseneck pipe 10 has a lofted flow path with the differently radiused and tangent centerline/guide curves. In FIG. 4, five exemplary cross-sectional diameters, normalized to the inlet diameter Ø are labeled. Gradually increasing the diameter of the cross-sectional flow path helps to slow the average fluid velocity, reducing the overall pressure loss through the approximately 180-degree-bend gooseneck pipe 10. Some of this reduced pressure loss is due to the lower fluid velocity resulting in less detrimental secondary flow patterns developing.

The geometry of the gooseneck pipe 10 does not lend itself well to plastic injection molding as a single component. It is technically unrealistic to mold such fluid path geometry and pull the inner core out, even with the collapsible core technologies currently available. By separating the gooseneck pipe 10 into the first 12 and second 16 pipe halves, the separate parts are easily moldable and can be welded together to form the gooseneck pipe 10. The parts may similarly be frictionally spin welded about an axis. With state-of-the-art servo spin welders, it can be determined when the resin is in a melt flow stage, and the welding process can be stopped with about 1 degree of precision of angular orientation between the parts. Any suitable connection methodology may be used, and the invention is not meant to be limited to the described methods. For example, the parts may be ultrasonically welded or welded using some other resin joining methodology. Other assemblies may include snap fit with O-ring, screws with O-ring, threaded parts, solvent bonding, induction welding, hot plate welding or the like. Other processes may include metal (aluminum or cast iron) sand casting.

Figure 7:
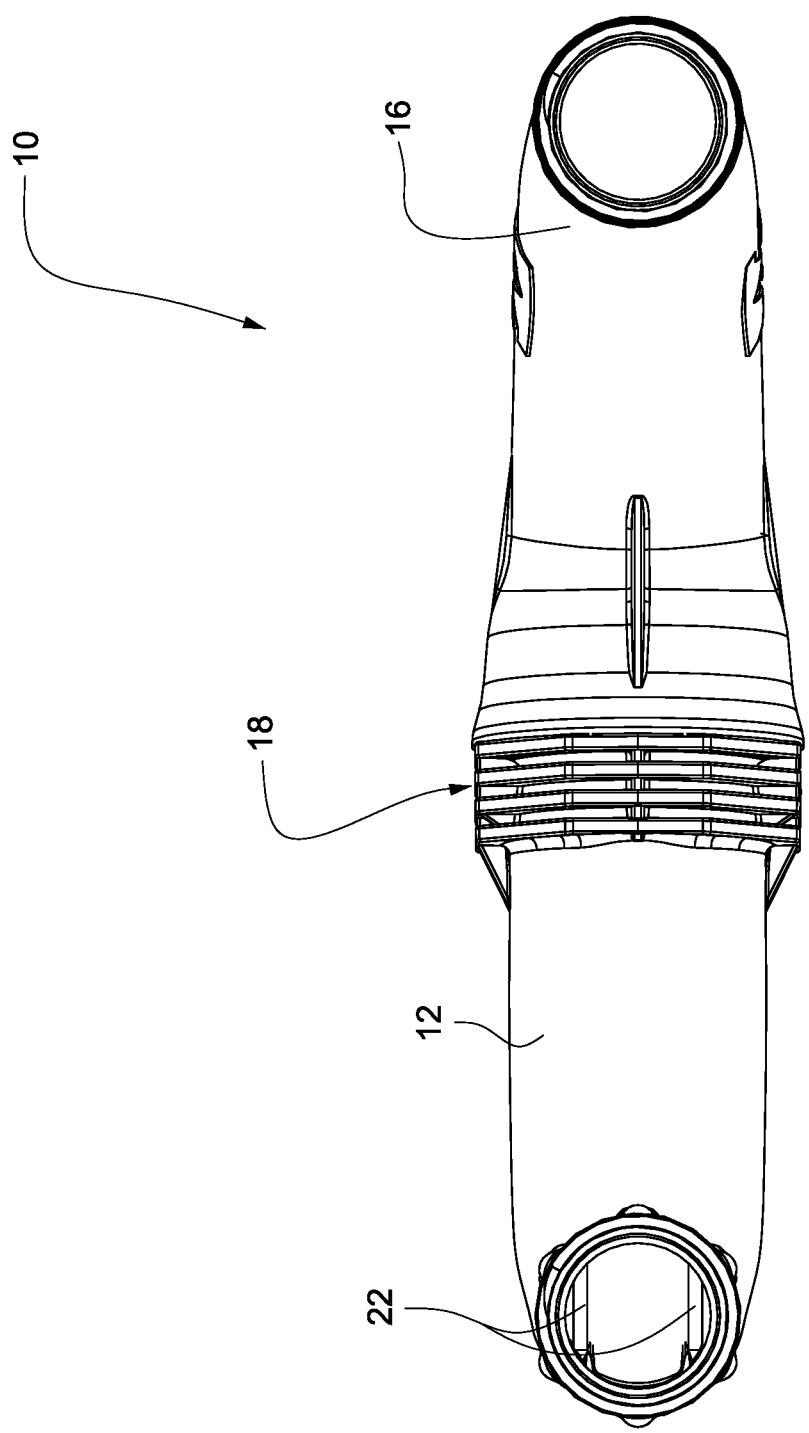
FIG. 7 is an end view of an exemplary gooseneck pipe including internal reinforcement ribs.

In some embodiments, one or both of the first and second pipe halves may be provided with a reinforcement rib. FIG. 7 shows an exemplary embodiment wherein the first pipe half 12 includes an internal reinforcement rib 22. Two internal reinforcement ribs 22 are shown. The internal reinforcement ribs 22 extend in a direction of the flow path. The reinforcement ribs 22 serve to add strength in tension and further reduce flow vortices. Reinforcement rib(s) 22 help share the load across the pipe threads of the first pipe half 12 engaged into the main span pipe. For example, if the regulator sprinkler package were to hang up in a crop canopy as the pivot is moved through the crop, substantial forces can be applied to the distal/outlet end 16-2 of the second pipe half 16. The structure of the gooseneck does a good job of handling these forces until these forces are realized as a moment/torque at the proximal /inlet end 12-1 of the first pipe half 12. This moment causes a tensile load on the threads of the outer radius and a compression load on the threads of the inner radius. There may also be a stress riser effect more pronounced on the threads in tension where they go from being engaged with the female threads of the main span pipe to unengaged (or free). The rib(s) 22 help to spread out and share this tensile load amongst/across more of the engaged threads. The ribs 22 also selectively provide more cross section (and material) to carry the tensile load where it may be needed, at the outer radius.

Figure 8:
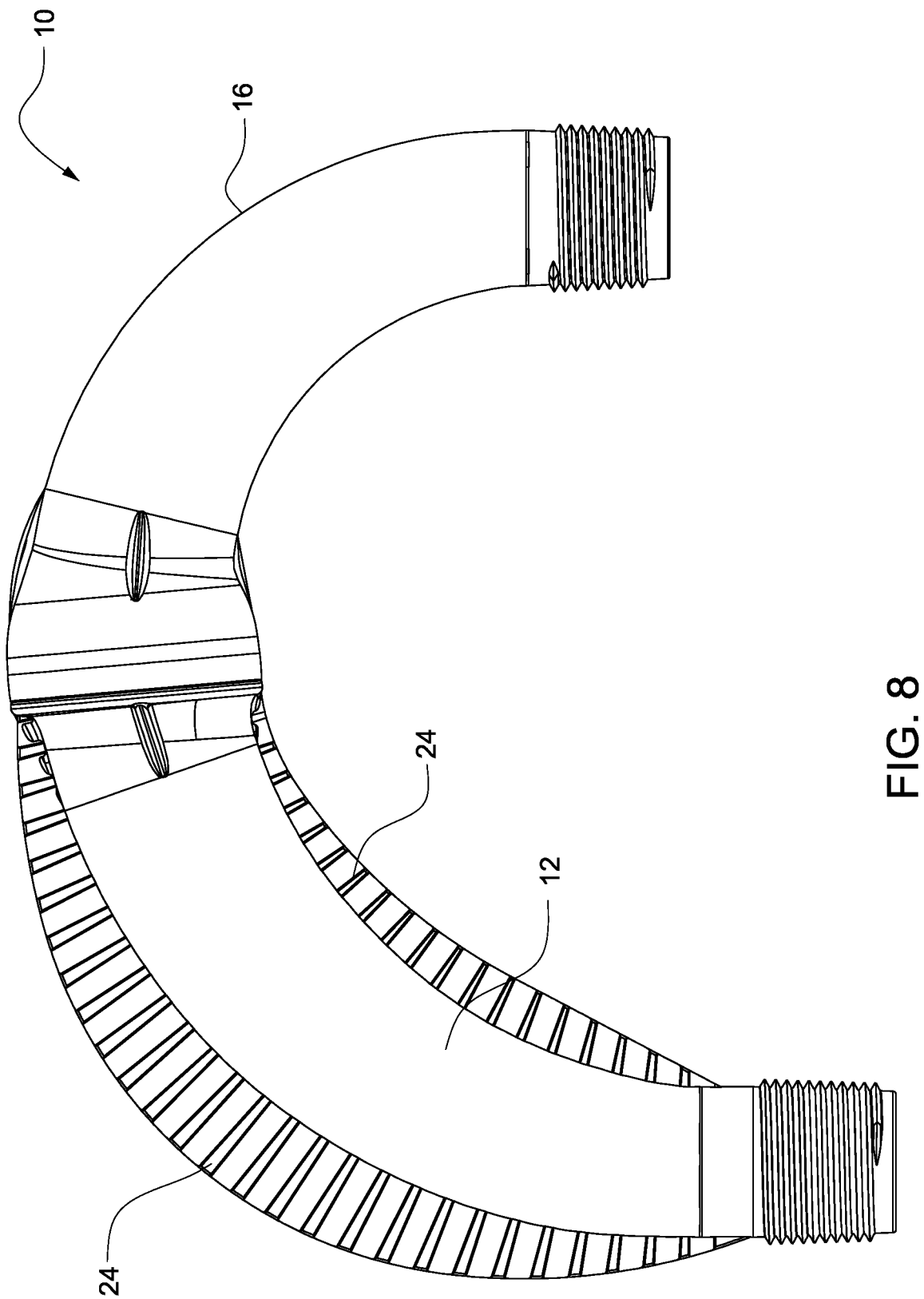
FIG. 8 is an exemplary gooseneck pipe with an external reinforcement rib.

As shown in FIG. 8, one or both of the pipe halves 12, 16 may be provided with an external reinforcement rib 24. The external rib 24 does not affect the flow but adds strength in tension or compression. The exemplary exterior reinforcement rib 24 shown in FIG. 8 is preferably disposed on an underside of the gooseneck pipe 10 and may be in the form of a molded plastic rib that extends from an area adjacent the pipe half inlet or proximal end 12-1 to an area adjacent to where the first pipe half 12 connects to the second pipe half 16, e.g., near the first pipe half distal end 12-2.

Figure 9:
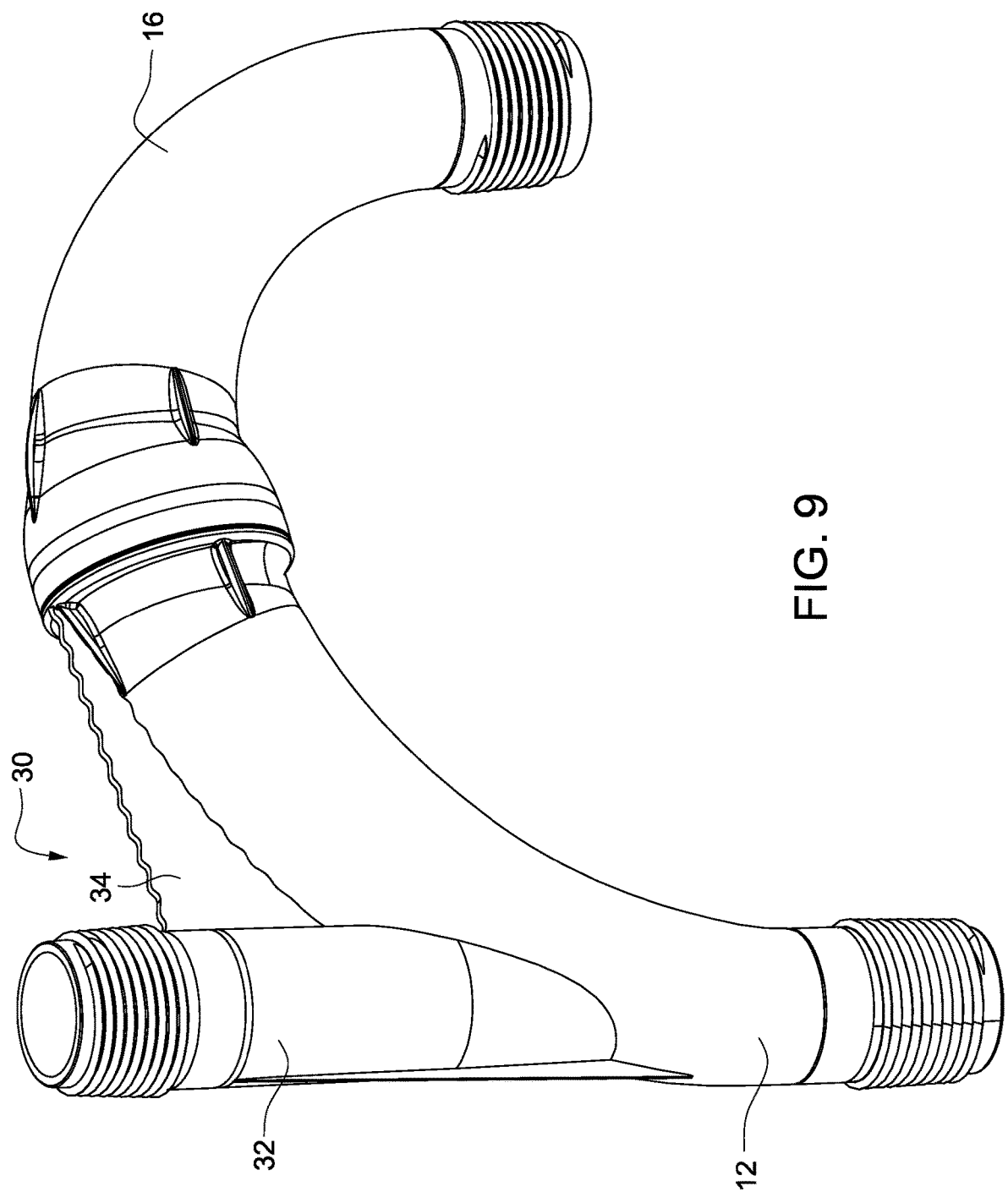
FIG. 9 is a perspective view of a gooseneck pipe including an auxiliary outlet port.
Figure 10:
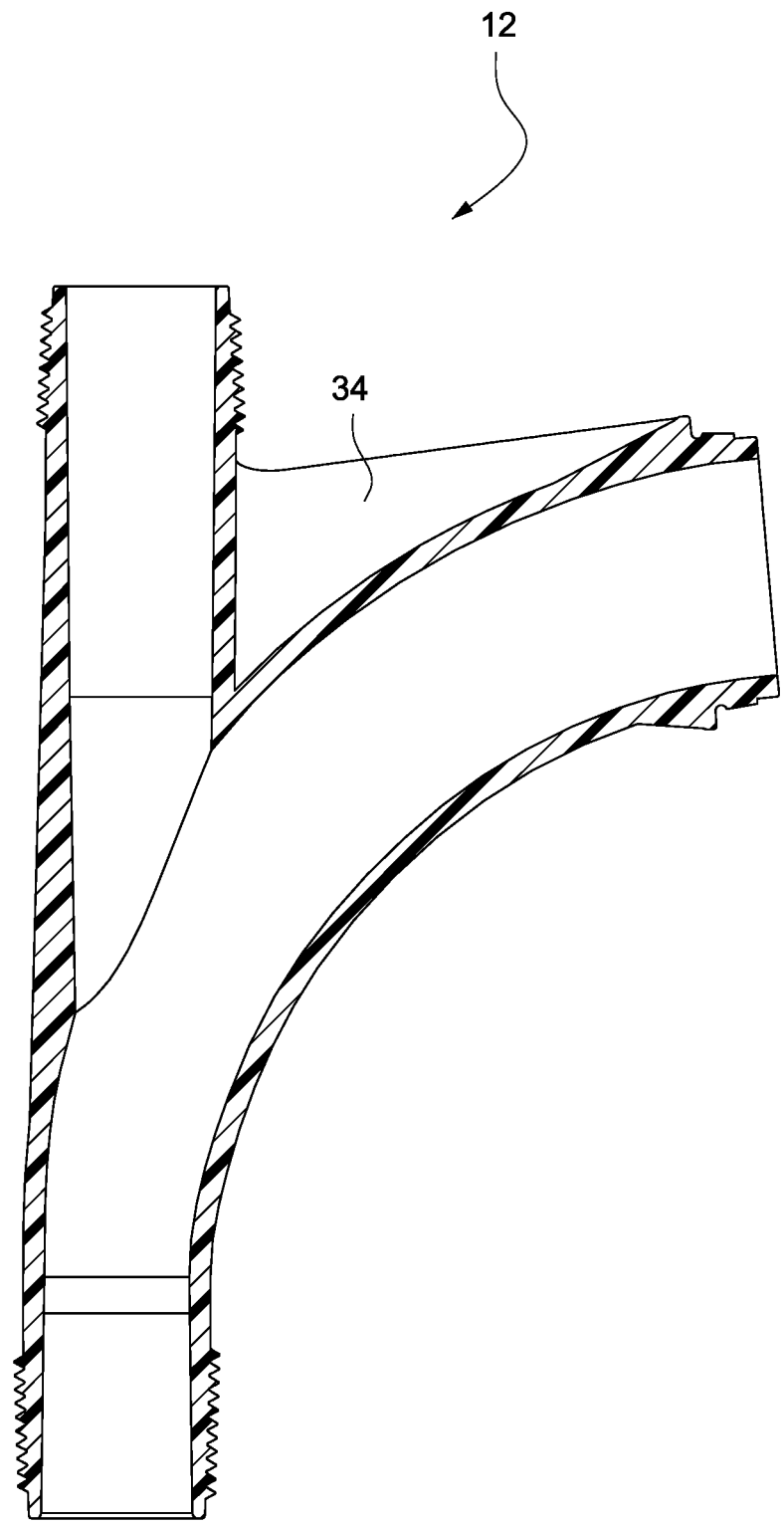
FIGS. 10 and 11 are cross-sectional views of respective first and second pipe halves of the gooseneck pipe shown in FIG. 9.
Figure 11:
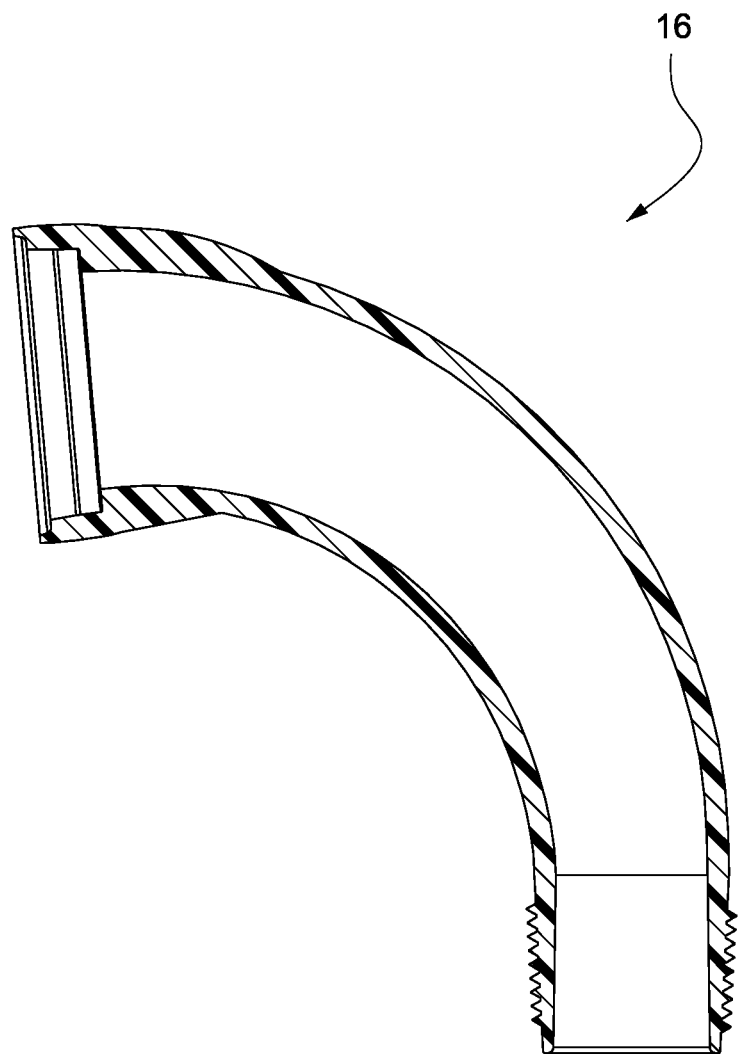

FIGS. 9-11 show a gooseneck (or geeseneck) pipe 30 of an alternative embodiment. In the embodiment shown in FIGS. 9-11, the pipe 30 includes an auxiliary outlet port 32 extending from the first pipe half 12. The auxiliary outlet port 32 provides for alternative or additional sprinkler coverage characteristics depending on a desired use. For example, a sprinkler head with different flow characteristics than the sprinkler heads mounted below the lateral pipe may be added to the auxiliary outlet port 32. With the auxiliary outlet port 32 extending upward from the first pipe half 12, it is possible to include an alternative or additional reinforcement rib 34 secured between the auxiliary outlet port 32 and the exterior surface of the distal part of the first pipe half 12. The reinforcement rib 34 may be alternative to or in addition to the lower reinforcement rib 24 shown in FIG. 8 and/or the internal reinforcement ribs 22 shown in FIG. 7.

Figure 12:
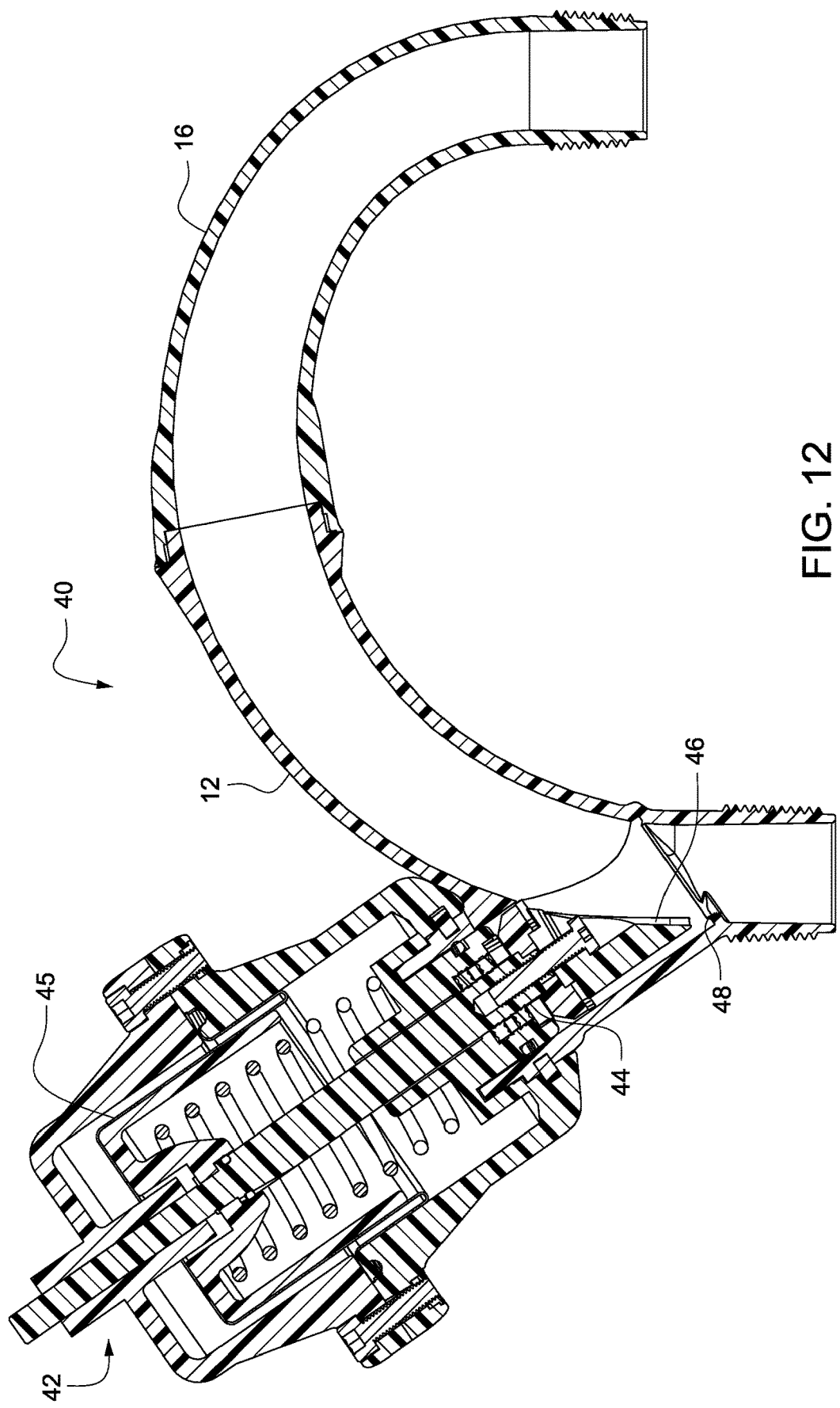
FIGS. 12 and 13 show exemplary embodiments of the gooseneck pipe incorporating a shut-off valve.
Figure 13:
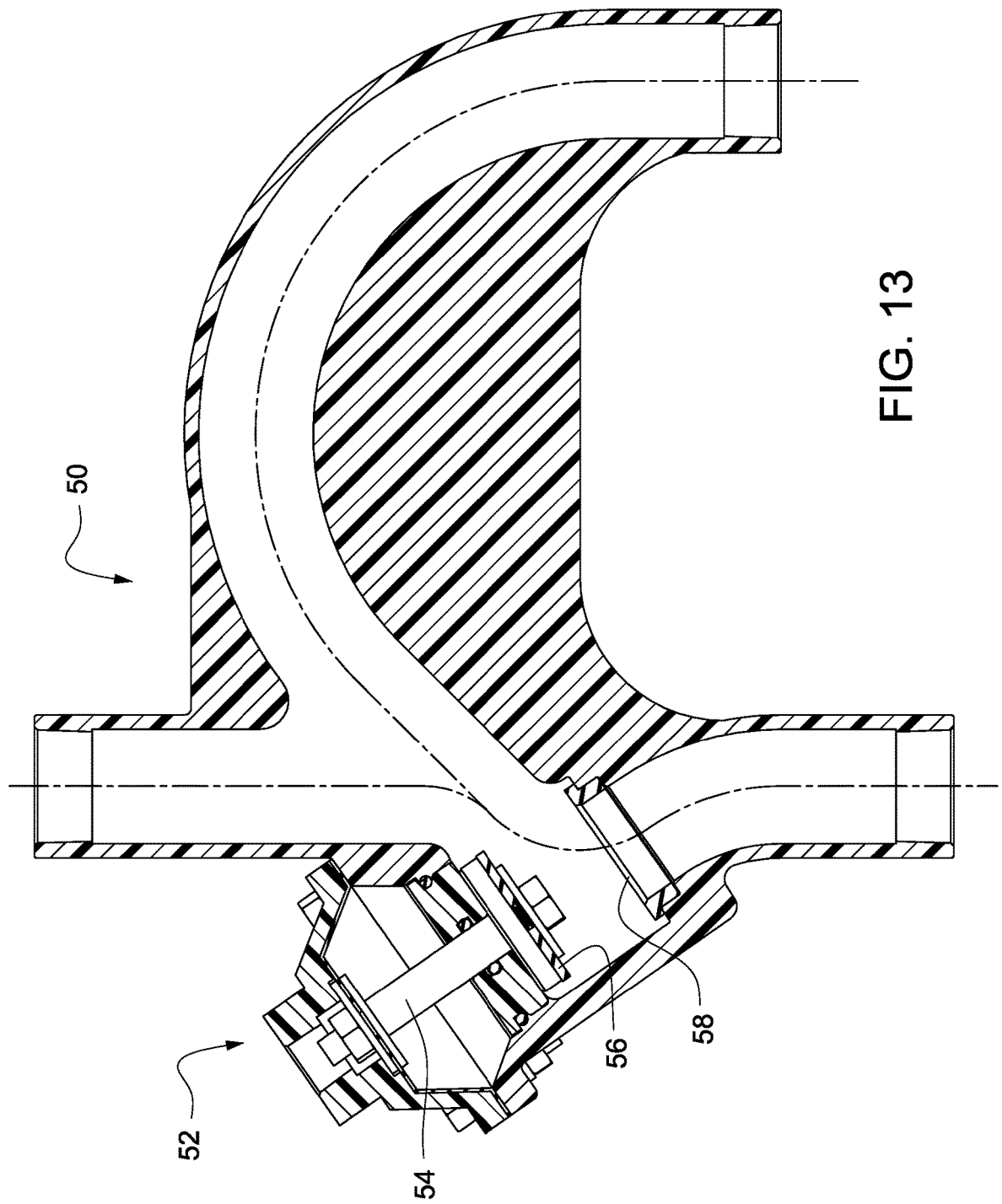

FIGS. 12 and 13 show gooseneck/geeseneck pipes 40, 50 of still alternative embodiments. The gooseneck pipes 40, 50 may be provided with a shut-off valve 42, 52 coupled with one of the first 12 and second 16 pipe halves. The gooseneck pipe 50 is shown in FIG. 13 as an alternative one-piece construction, but this pipe 50 may similarly incorporate the first and second pipe halves. The valve structure for valve 42 shown in FIG. 12 includes a valve stem 44 that is actuated using water pressure and a rolling diaphragm 45. A valve seat 46 at an end of the valve stem 44 may be curved along its length and across its width. The curved shape improves the flow path at the wide open state.

The shut-off valve 52 in FIG. 13 includes a valve stem 54 and a valve seat 56, which may be flat-faced or with a spherical radius. The spherical radius valve seat 56 improves valve seating by mitigating misalignment. A conically formed surface of the valve seat 56 reduces resistance to water flow when the valve is open. The shut-off valve 52 also includes a valve shut-off face 58 that receives the valve seat 56.

In manufacturing the gooseneck pipe, with reference again to FIGS. 3-7, for example, the first 12 and second 16 pipe halves are molded with respective first 14 and second 20 radiused centerline curves. The molding processes are practiced such that cross-sectional diameters of the first 12 and second 16 pipe halves vary along the flow path. The first 12 and second 16 pipe halves are then connected using a suitable connecting process such as friction welding or the like as described above. The molding processes may be practiced such that the cross-sectional diameters of the first 12 and second 16 pipe halves are configured to mitigate Dean vortices or secondary flow patterns when a fluid in the flow path is turned by the gooseneck pipe. The molding processes may be practiced such that, in a flow direction, the cross-sectional diameter of the first pipe half 12 increases along the flow path and the cross-sectional diameter of the second pipe half 16 decreases along the flow path. The first 12 and second 16 pipe halves may be molded such that the first radiused centerline curve 14 is larger than the second radiused centerline curve 20.

Utilizing a two-piece mold design, the gooseneck pipe according to the described embodiments is provided with varying cross-sectional diameters to optimize the flow path. By increasing the cross-sectional area in the section of the pipe that turns the fluid, pressure losses can be reduced for greater flow rates, which can become significant over an entire pivot. The optimized flow path helps to mitigate the extent of Dean vortices or secondary flow patterns when high flow rates of fluid are turned 180 degrees in the gooseneck.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A gooseneck pipe comprising:
   a first pipe half having a first radiused centerline curve; and
   a second pipe half fixed to the first pipe half and having a second radiused centerline curve, the first and second pipe halves defining a flow path for a fluid under pressure, wherein in a flow direction, the cross-sectional diameter of the first pipe half increases along the flow path to a joint between the first pipe half and the second pipe half, and the cross-sectional diameter of the second pipe half decreases along the flow path from the joint between the first pipe half and the second pipe half.

2. A gooseneck pipe according to claim 1, wherein the cross-sectional diameter at a distal end of the first pipe half is about 1.5 times that of the cross-sectional diameter at a proximal end of the first pipe half, and wherein the cross-sectional diameter at a proximal end of the second pipe half is about 1.5 times that of the cross-sectional diameter at a distal end of the second pipe half.

3. A gooseneck pipe according to claim 1, wherein the cross-sectional diameters of the first and second pipe halves are configured to mitigate pressure losses due in part to Dean vortices or secondary flow patterns when a fluid in the flow path is turned by the gooseneck pipe.

4. A gooseneck pipe according to claim 1, wherein the first radiused centerline curve is larger than the second radiused centerline curve.

5. A gooseneck pipe according to claim 4, wherein the first radiused centerline curve is tangent to the second radiused centerline curve.

6. A gooseneck pipe according to claim 1, wherein the flow path is curved in one of a circular and elliptical configuration.

7. A gooseneck pipe according to claim 1, wherein an entrance angle of the first pipe half is substantially tangent to the first radiused centerline curve.

8. A gooseneck pipe according to claim 7, wherein an exit angle of the second pipe half is substantially tangent to the second radiused centerline curve.

9. A gooseneck pipe according to claim 1, wherein the first pipe half is connected to the second pipe half with a friction weld.

10. A gooseneck pipe according to claim 1, wherein at least one of the first pipe half and the second pipe half comprises a reinforcement rib.

11. A gooseneck pipe according to claim 10, wherein the first pipe half comprises an external reinforcement rib.

12. A gooseneck pipe according to claim 1, wherein the first pipe half comprises a pair of internal reinforcement ribs that extend in a direction of the flow path.

13. A gooseneck pipe according to claim 1, further comprising an auxiliary outlet port extending from the first pipe half.

14. A gooseneck pipe according to claim 13, further comprising an external reinforcement rib connected between the auxiliary outlet port and the first pipe half.

15. A gooseneck pipe according to claim 1, further comprising a shut-off valve coupled with one of the first and second pipe halves.

16. A gooseneck pipe according to claim 15, wherein the shut-off valve comprises a valve assembly including a valve stem and a valve seat disposed at a distal end of the valve stem, wherein the one of the first and second pipe halves comprises a valve shut-off face with which the valve seat is engageable in a valve-closed position.

17. A gooseneck pipe according to claim 16, wherein the valve seat is curved along its length and across its width.

18. A gooseneck pipe according to claim 1, wherein the second radiused centerline curve is different from the first radiused centerline curve.

19. A gooseneck pipe comprising:
   a first pipe half having a first radiused centerline curve; and
   a second pipe half fixed to the first pipe half and having a second radiused centerline curve, different from the first radiused centerline curve, the first and second pipe halves defining a flow path,
   wherein a cross-sectional diameter of the first pipe half increases along the flow path to a joint between the first pipe half and the second pipe half, wherein a cross-sectional diameter of the second pipe half decreases along the flow path from the joint between the first pipe half and the second pipe half, and
   wherein the first radiused centerline curve is larger than the second radiused centerline curve.

20. A gooseneck pipe according to claim 19, wherein the first radiused centerline curve is tangent to the second radiused centerline curve.

21. A method of manufacturing a gooseneck pipe, the method comprising:
   molding a first pipe half having a first radiused centerline curve;
   molding a second pipe half having a second radiused centerline curve; different from the first radiused centerline curve, the first and second pipe halves defining a flow path, wherein the molding processes are practiced such that cross-sectional diameters of the first and second pipe halves vary along the flow path; and
   connecting the first pipe half and the second pipe half.

22. A method according to claim 21, wherein the molding processes are practiced such that, in a flow direction, the cross-sectional diameter of the first pipe half increases along the flow path, and the cross-sectional diameter of the second pipe half decreases along the flow path.

23. A method according to claim 21, wherein the molding processes are practiced such that the cross-sectional diameters of the first and second pipe halves are configured to mitigate Dean vortices or secondary flow patterns when a fluid in the flow path is turned by the gooseneck pipe.

24. A method according to claim 21, wherein the molding processes are practiced such that the first radiused centerline curve is larger than the second radiused centerline curve.

\* \* \* \* \*